(12) United States Patent
Budge (10) Patent No.: US 8,438,370 B1
(45) Date of Patent: May 7, 2013

(54) PROCESSING OF LOOPS WITH INTERNAL DATA DEPENDENCIES USING A PARALLEL PROCESSOR

(75) Inventor: Brian C. Budge, Davis, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1245 days.

(21) Appl. No.: 11/608,762

(22) Filed: Dec. 8, 2006

(51) Int. Cl.
*G06F 9/30* (2006.01)

(52) U.S. Cl.
USPC .......................................................... 712/241

(58) Field of Classification Search .................. None
See application file for complete search history.

(56) References Cited

U.S. PATENT DOCUMENTS

| | | | |
|---|---|---|---|
| 6,216,174 B1* | 4/2001 | Scott et al. ..................... | 713/375 |
| 6,897,871 B1 | 5/2005 | Morein et al. | |
| 7,526,634 B1* | 4/2009 | Duluk et al. .................. | 712/216 |
| 7,584,342 B1* | 9/2009 | Nordquist et al. .............. | 712/22 |
| 7,640,284 B1* | 12/2009 | Goodnight et al. ........... | 708/404 |
| 7,697,007 B1* | 4/2010 | Duluk, Jr. ....................... | 345/522 |
| 7,788,468 B1* | 8/2010 | Nickolls et al. .................. | 712/22 |
| 7,836,116 B1* | 11/2010 | Goodnight et al. ........... | 708/404 |
| 7,861,060 B1* | 12/2010 | Nickolls et al. .................. | 712/22 |
| 7,865,894 B1* | 1/2011 | Nordquist et al. ............. | 718/102 |
| 7,937,567 B1* | 5/2011 | Nickolls et al. ............... | 712/220 |
| 2004/0215932 A1* | 10/2004 | Burky et al. ..................... | 712/43 |
| 2004/0215939 A1* | 10/2004 | Armstrong et al. ........... | 712/220 |
| 2004/0216120 A1* | 10/2004 | Burky et al. .................. | 718/107 |

OTHER PUBLICATIONS

Feitelson, "Packing Schemes for Gang Scheduling", Proceedings of the Workshop on Job Scheduling Strategies for Parallel Processing, Lecture Notes in Computer Science, vol. 1162, 1996, pp. 89-110.*
Mersenne Twister Algorithm (last modified on Feb. 26, 2004), downloaded on Sep. 29, 2009 from http://www.umiacs.umd.edu/~yangcj/mtrnd.h.*
Eggers et al. "Simultaneous multithreading: A platform for next-generation processors" IEEE Micro, Sep./Oct. 1997(vol. 17, No. 5) pp. 12-19.

* cited by examiner

*Primary Examiner* — Robert Fennema
(74) *Attorney, Agent, or Firm* — Kilpatrick Townsend & Stockton LLP (57) ABSTRACT

Loops with internal data dependencies (e.g., in a Mersenne Twister pseudorandom number generator) are implemented by exploiting arrays of cooperating threads that can be executed concurrently using a suitably configured processor. In one implementation, each thread is assigned to update a different element of a data array where updating of later elements depends on updates to earlier elements. Thread synchronization techniques are advantageously used to control the order in which different threads update their assigned elements such that the data dependencies are correctly handled. To the extent that threads assigned to different data elements do not have data dependencies on each other, those threads can be executed in parallel.

20 Claims, 6 Drawing Sheets

PROCESSING OF LOOPS WITH INTERNAL DATA DEPENDENCIES USING A PARALLEL PROCESSOR

CROSS-REFERENCES TO RELATED APPLICATIONS

The present disclosure is related to commonly-assigned co-pending application Ser. No. 11/303,780, filed Dec. 15, 2005, entitled "Synchronization of Threads in a Cooperative Thread Array," the disclosure of which is incorporated herein by reference for all purposes.

BACKGROUND OF THE INVENTION

The present invention relates in general to parallel data processing and in particular to processing of loops with internal data dependencies using a parallel processor.

Loops with internal data dependencies (i.e., where one iteration of the loop relies on a result computed during a previous iteration) are included in a variety of data-processing algorithms. An example is the Mersenne Twister, a well-known algorithm for generating sequences of pseudorandom numbers. One common implementation of the Mersenne Twister generates a stream of 32-bit values with a random-seeming distribution. In this implementation, a state array MT[0:623] of 624 32-bit values is initialized from a seed supplied by a user. To generate 624 pseudorandom numbers, the state array MT is first updated using a feedback shift procedure (referred to herein as the "twister phase" of the algorithm) represented by the following pseudocode fragment:

for $kk$=0 to 622{

$y$=MSB(MT[$kk$])|LSBS(MT[$kk$+1]);

MT[$kk$]=$U$(MT[($kk$+397)%624],$y$);

}

$y$=MSB(MT[623])|LSBS(MT[0]);

MT[623]=$U$(MT[396],$y$);  (Eq. 1)

In this pseudocode fragment, "MSB" is a function that extracts the most significant bit of a 32-bit value, "LSBS" is a function that extracts the 31 least significant bits of a 32-bit value, "|" is a bit-field concatenation operator, and "%" is the modulo operator. U is a bit manipulation function defined as:

$$U(x, y) = \begin{cases} x^\wedge(y<<1) & \text{even } y \\ x^\wedge(y<<1)^\wedge(2567483615), & \text{odd } y, \end{cases} \quad (Eq. 2)$$

where "<<" is a left-shift operator and "^" is a bitwise XOR (exclusive or) operator.

After updating MT, an array of 624 pseudorandom numbers random[0:623] can be produced in a "generation phase" that uses bit manipulations on each element of MT, referred to herein as "tempering shifts." For example, the following pseudocode fragment can be used:

for $kk$=0 to 623{

$y$=MT[$kk$];

$y$=$y$^(($y$>>11));

$y$=$y$^(($y$<<7)&2636928640);

$y$=$y$^(($y$<<15)&4022730752);

$y$=$y$^($y$>>18);

random[$kk$]=$y$;

}  (Eq. 3)

In this pseudocode fragment, ">>" is a right-shift operator, and "&" is a bitwise AND operator. Unlike Eq. 1, Eq. 3 does not modify any of the values in the state array MT.

After generating the array of pseudorandom numbers, the twister phase can be performed again and another array of 624 numbers can be generated, allowing the pseudorandom sequence to be extended indefinitely. The Mersenne Twister produces a pseudorandom sequence with an extremely long period ($2^{19937}$ in one 32-bit implementation) and computes pseudorandom numbers relatively quickly; hence it has become widely used in a variety of applications.

Conventionally, the Mersenne Twister is executed using a single processing thread. The loop iterations in the twister phase are executed sequentially, then the loop iterations in the random number phase. The Mersenne Twister has also been implemented on parallel processing systems, e.g., systems with multiple CPUs. In such implementations, each CPU executes the algorithm described above to generate a stream of pseudorandom numbers, but each CPU starts from a different seed so that the streams from different CPUs are all different.

BRIEF SUMMARY OF THE INVENTION

Existing implementations of the Mersenne Twister execute the iterations of twister-phase loop sequentially. Implementing loop-level parallelism (executing multiple iterations of the loop in parallel) is difficult because the loop has internal data dependencies.

For instance, state array element MT[0] needs to be updated before state array element MT[227] can be updated, and so on. Thus, the order in which different iterations of the loop are performed must be controlled, or the result will not correspond to the result of a single-threaded sequential execution of the loop iterations.

Embodiments of the present invention provide implementations of the Mersenne Twister and other loops with internal data dependencies by exploiting arrays of cooperating threads that can be executed concurrently using a suitably configured processor. In such an array, all threads execute the same program code and can be synchronized with each other at desired points during program execution. In an implementation of the Mersenne Twister, for instance, each thread can be assigned to update a different element of the state array, and thread synchronization is advantageously used to control the order in which different threads update their assigned elements such that the data dependencies are correctly handled. To the extent that threads assigned to different data elements do not have data dependencies on each other, those threads can be executed in parallel, providing a potentially significant performance advantage over sequential or single-threaded implementations for generating a single stream of pseudorandom numbers.

According to one aspect of the present invention, a method for generating a plurality of data values includes defining a thread array having a number of threads, each of which is assigned to compute a different one of a number of data values. Each thread is configured to execute a same program.

Each thread is assigned to one of some number of subsets of threads that are independent of each other; assignments may be made, e.g., using a unique thread identifier of each thread. The subsets include at least a first subset and a second subset, where none of the threads in the first subset depend on data values to be computed by any of the threads in the second subset but at least some of threads in the second subset depend on data values to be computed by at least some of the threads in the first subset. The thread array is executed. During execution, each of the threads in the first subset computes a data value and stores the data value in a memory. Each of the threads in the second subset also computes a data value and stores the data value in the memory. For at least some of the threads in the second subset, computing the data value includes reading from the memory at least one of the data values generated by the threads in the first subset. Execution of different threads is ordered so that all of the threads in the first subset storing their data values in the memory before any of the threads in the second subset compute their data values. For example, each thread may execute a thread synchronization command that synchronizes the threads at a point at which all of the threads in the first subset have stored their data values in the memory and before any of the threads in the second subset compute their data values.

It should be noted that two or more (or all) of the threads in the first subset may compute their data values in parallel, and two or more (or all) of the threads in the second subset may also compute their data values in parallel.

In some embodiments, the threads can be divided into three or more subsets. For instance, at least some of the threads in the third subset might depend on data values to be computed by threads in the second subset. During program execution, each of the threads in the third subset computes a data value and stores the data value in the memory; as with the first and second subsets, all of the threads in the second subset advantageously store their data values in the memory before any of the threads in the third subset compute their data values.

According to another aspect of the present invention, a method for updating data elements (e.g., elements of a state array MT for a Mersenne Twister pseudorandom number generator) includes defining a thread array having a number of threads, each configured to execute the same program for a different data element. Each thread is associated with a target one of the data elements to be updated and is also associated with a source one of the of data elements, where the source data element is to be used to update the target data element. Each thread is assigned to one of a number of subsets of threads that independently update their respective target data elements. In this aspect, each thread in a first one of the subsets update their respective target data elements using an initial value of their respective source data elements, and at least some of the target data elements associated with the threads of the first subset are the source data elements for at least some of the threads in a second one of the subsets. The thread array is executed. During execution, each of the threads in the first subset computes an updated value for its respective target data element based at least in part on the initial value of its respective source data element and stores the updated value of the target data element in a memory. Each of the threads in the second subset computes an updated value for its respective target data element using the value of the source data element associated therewith and stores the updated value of the target data element in the memory. In at least some cases, the source data value used by the thread in the second subset is an updated value that was computed by one of the threads in the first subset. Execution of the different threads is ordered so that all of the threads in the first subset store the updated values of their target data elements in the memory before any of the threads in the second subset compute updated values of their target data elements.

In some embodiments, the data elements can be, for instance, elements of a state array for a pseudorandom number generator such as the Mersenne Twister. After all of the threads in the thread array have updated their respective target data elements, each thread may generate a respective pseudorandom value using its respective target data element. The pseudorandom values can be stored in an output array in a memory, with each thread storing its respective pseudorandom value in a different location in the output array.

According to still another aspect of the present invention, a computer program product includes a computer readable medium encoded with program code for controlling operation of a computer system. The program code includes program code for defining a thread array having a number of threads, where each thread is assigned to compute a different one of a plurality of data values. The program code also assigns each thread to one of a number of subsets of threads that are independent of each other, including at least a first subset and a second subset. None of the threads in the first subset depends on data values to be computed by any of the threads in the second subset, but at least some of threads in the second subset depend on data values to be computed by at least some of the threads in the first subset. Additional program code to be executed by the threads includes a first block of program code that is executable only by threads in the first subset for computing a data value and storing the data value in a memory, as well as a second block of program code that is executable only by threads in the second subset for computing a data value and storing the data value in the memory. For at least some of the threads in the second subset, computing the data value includes reading from the memory at least one of the data values generated by the threads in the first subset. The program code also includes control code (e.g., a thread synchronization command) such that the first block is executed by all of the threads in the first subset before the second block is executed by any of the threads in the second subset.

The following detailed description together with the accompanying drawings will provide a better understanding of the nature and advantages of the present invention.

DETAILED DESCRIPTION OF THE INVENTION

Embodiments of the present invention provide implementations of the Mersenne Twister and other loops with internal data dependencies by exploiting arrays of cooperating threads that can be executed concurrently using a suitably configured processor. In such an array, all threads execute the same program code and can be synchronized with each other at desired points during program execution. In one implementation of the Mersenne Twister, for instance, each thread is assigned to update a different element of the state array, and thread synchronization is advantageously used to control the order in which different threads update their assigned elements such that the data dependencies are correctly handled. To the extent that threads assigned to different data elements do not have data dependencies on each other, those threads can be executed in parallel, providing a potentially significant performance advantage.

System Overview

Figure 1:
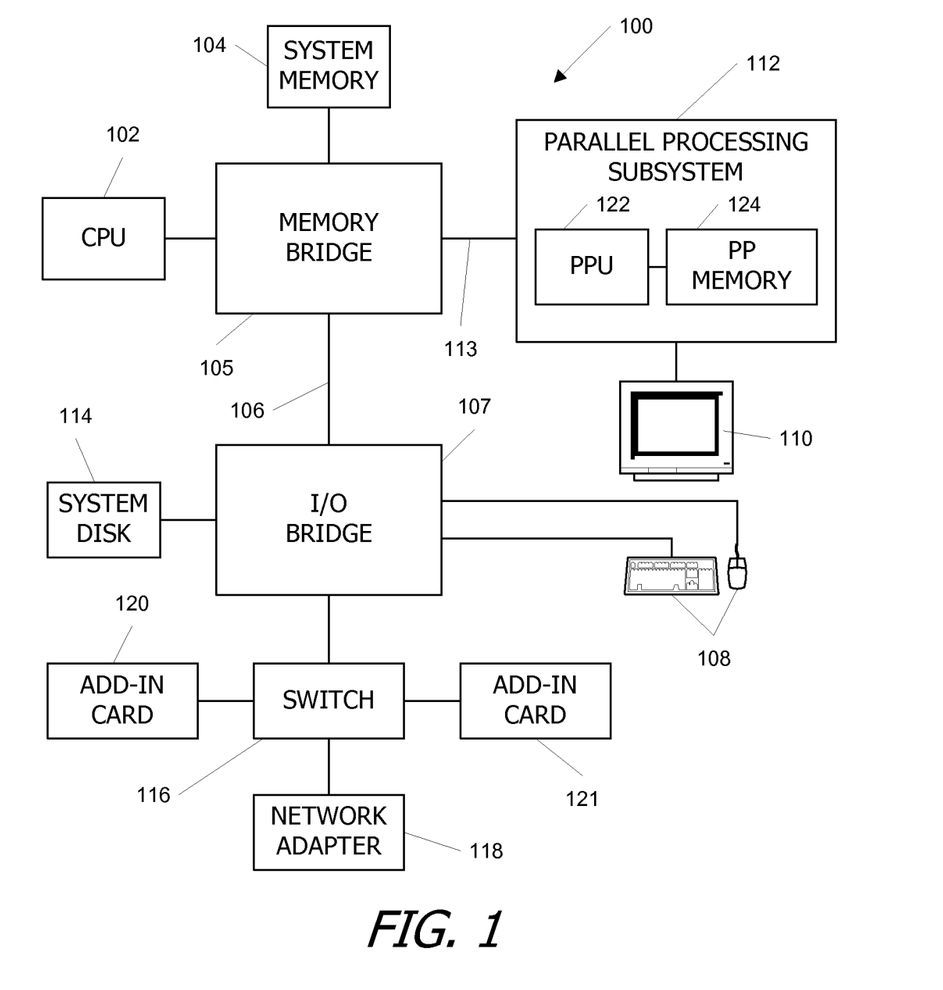
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to I/O bridge 107 via a bus or other communication path 113 (e.g., a PCI Express or Accelerated Graphics Port link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, e.g., using one or more integrated circuit devices such as programmable processors, application specific integrated circuits (ASICs), and memory devices. PPU 122 advantageously implements a highly parallel processor including one or more processing cores, each of which is capable of executing a large number (e.g., hundreds or thousands) of threads concurrently. PPU 122 can be programmed to perform a wide array of computations, including linear and nonlinear data transforms, filtering of video and/or audio data, pseudorandom number generation, modeling (e.g., applying laws of physics to determine position, velocity and other attributes of objects), image rendering, and so on. PPU 122 may transfer data from system memory 104 and/or PP memory 124 into internal memory, process the data, and write result data back to system memory 104 and/or PP memory 124, where such data can be accessed by other system components, including, e.g., CPU 102. In some embodiments, PPU 122 is a graphics processor that can also be configured to perform various tasks related to generating pixel data from graphics data supplied by CPU 102 and/or system memory 104 via memory bridge 105 and bus 113, interacting with PP memory 124 (which can be used as graphics memory including, e.g., a conventional frame buffer) to store and update pixel data, delivering pixel data to display device 110, and the like. In some embodiments, PP subsystem 112 may include one PPU 122 operating as a graphics processor and another PPU 122 used for general-purpose computations. The PPUs may be identical or different, and each PPU may have its own dedicated PP memory device(s).

CPU 102 operates as the master processor of system 100, controlling and coordinating operations of other system components. In particular, CPU 102 issues commands that control the operation of PPU 122. In some embodiments, CPU 102 writes a stream of commands for PPU 122 to a command buffer, which may be in system memory 104, PP memory 124, or another storage location accessible to both CPU 102 and PPU 122. PPU 122 reads the command stream from the command buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, PP subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, PP system 112 is implemented as an add-in card that can be inserted into an expansion slot of system 100. In other embodiments, a PPU can be integrated on a single chip with a bus bridge, such as memory bridge 105 or I/O bridge 107. In still other embodiments, some or all elements of PPU 122 are integrated with CPU 102.

A PPU may be provided with any amount of local PP memory, including no local memory, and may use local memory and system memory in any combination. For instance, PPU 122 can be a graphics processor in a unified memory architecture (UMA) embodiment; in such embodiments, little or no dedicated graphics memory is provided, and PPU 122 would use system memory exclusively or almost exclusively. In UMA embodiments, the PPU may be integrated into a bridge chip or provided as a discrete chip with a high-speed link (e.g., PCI-E) connecting the PPU to the bridge chip and system memory.

It is also to be understood that any number of PPUs may be included in a system, e.g., by including multiple PPUs on a single add-in card or by connecting multiple add-in cards to path 113. Multiple PPUs may be operated in parallel to process data at higher throughput than is possible with a single PPU.

Systems incorporating PPUs may be implemented in a variety of configurations and form factors, including desktop, laptop, or handheld personal computers, servers, workstations, embedded systems, video game consoles, and so on.

Core Overview

Figure 2:
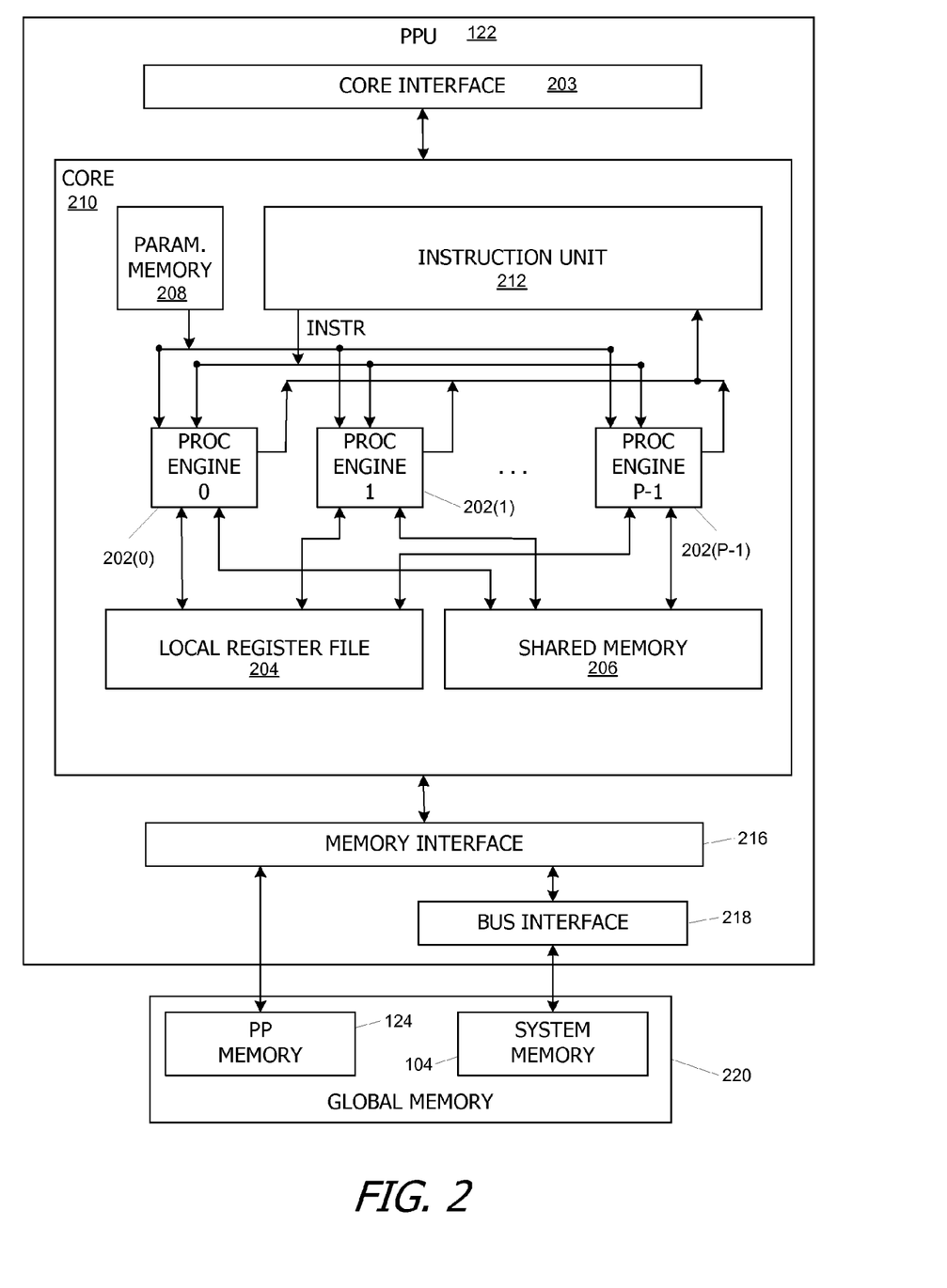
FIG. 2 is a block diagram of a parallel processing unit usable in an embodiment of the present invention.

FIG. 2 is a block diagram of a PPU 122 usable in an embodiment of the present invention. PPU 122 includes a core 210 configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, core 210 includes an array of P (e.g., 8, 16, etc.) parallel processing engines 202 configured to receive SIMD instructions from a single instruction unit 212. Each processing engine 202 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 202 uses space in a local register file (LRF) 204 for storing its local input data, intermediate results, and the like. In one embodiment, local register file 204 is physically or logically divided into P lanes, each having some number of entries (where each entry might store, e.g., a 32-bit word). One lane is assigned to each processing engine 202, and corresponding entries in different lanes can be populated with data for different threads executing the same program to facilitate SIMD execution. In some embodiments, each processing engine 202 can only access LRF entries in the lane assigned to it. The total number of entries in local register file 204 is advantageously large enough to support multiple concurrent threads per processing engine 202.

Each processing engine 202 also has access to an on-chip shared memory (e.g., a shared register file) 206 that is shared among all of the processing engines 202 in core 210. Shared memory 206 may be as large as desired, and in some embodiments, any processing engine 202 can read to or write from any location in shared memory 206 with equally low latency (e.g., comparable to accessing local register file 204). In some embodiments, shared memory 206 is implemented using shared cache memory, addressable RAM, or other types of conventional memory circuits.

In addition to shared memory 206, some embodiments also provide additional on-chip parameter memory and/or cache(s) 208, which may be implemented, e.g., as a conventional RAM or cache. Parameter memory/cache 208 can be used, e.g., to hold state parameters and/or other data (e.g., textures or primitives for a shader program) that may be needed by multiple threads. Processing engines 202 also have access via a memory interface 216 to additional off-chip global memory 220, which includes, e.g., PP memory 124 and/or system memory 104, with system memory 104 being accessible by memory interface 216 via a bus interface 218; it is to be understood that any memory external to PPU 122 may be used as global memory 220. Memory interface 216 and bus interface 218 may be of generally conventional design, and other appropriate interfaces may be substituted. Processing engines 202 are advantageously coupled to memory interface 216 via an interconnect (not explicitly shown) that allows any processing engine 202 to access global memory 220.

In one embodiment, each processing engine 202 is multithreaded and can execute up to some number G (e.g., 24) of threads concurrently, e.g., by maintaining current state information associated with each thread in a different portion of its assigned lane in local register file 204. Processing engines 202 are advantageously designed to switch rapidly from one thread to another so that instructions from different threads can be issued in any sequence without loss of efficiency.

Instruction unit 212 is configured such that, for any given processing cycle, the same instruction (INSTR) is issued to all P processing engines 202. Thus, at the level of a single clock cycle, core 210 implements a P-way SIMD microarchitecture. Since each processing engine 202 is also multithreaded, supporting up to G threads, core 210 in this embodiment can have up to P*G threads executing concurrently. For instance, if P=16 and G=24, then core 210 supports up to 384 concurrent threads.

Because instruction unit 212 issues the same instruction to all P processing engines 202 in parallel, core 210 is advantageously used to process threads in "SIMD groups." As used herein, a "SIMD group" refers to a group of up to P threads of execution of the same program on different input data, with one thread of the group being assigned to each processing engine 202. (A SIMD group may include fewer than P threads, in which case some of processing engines 202 will be idle during cycles when that SIMD group is being processed.) Since each processing engine 202 can support up to G threads, it follows that up to G SIMD groups can be executing in core 210 at any given time.

On each clock cycle, one instruction is issued to all P threads making up a selected one of the G SIMD groups. To indicate which thread is currently active, a "group index" (GID) for the associated thread may be included with the instruction. Processing engine 202 uses group index GID as a context identifier, e.g., to determine which portion of its assigned lane in local register file 204 should be used when executing the instruction. Thus, in a given cycle, all processing engines 202 in core 210 are nominally executing the same instruction for different threads in the same group. (In some instances, some threads in a group may be temporarily idle, e.g., due to conditional or predicated instructions, divergence at branches in the program, or the like.)

Operation of core 210 is advantageously controlled via a core interface 203. In some embodiments, core interface 203 receives data to be processed as well as state parameters and commands defining how the data is to be processed (e.g., what program is to be executed, number of threads and so on). Core interface 203 can allocate data-processing resources in core 210 (e.g., space in shared memory 206 and/or local register file 204, group index values, etc.) and can also load data to be processed into shared memory 206 and/or parameters into parameter memory 208. Core interface 203 also initializes each new thread or SIMD group in instruction unit 212, then signals instruction unit 212 to begin executing the threads. When execution of a thread or SIMD group is completed, core 210 advantageously notifies core interface 203. Core interface 203 can then initiate other processes, e.g., to retrieve output data from shared memory 206 and/or to prepare core 210 for execution of additional threads.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 210 is shown, a PPU 122 may include any number of cores 210, with appropriate work distribution logic to distribute incoming processing tasks among the available cores 210, further increasing the processing capacity. Each core 210 advantageously operates independently of other cores 210 and has its own processing engines, shared memory, and so on. Where multiple cores 210 are present, PPU 122 may include a work distribution unit (not explicitly shown) that distributes processing tasks among the available cores.

Cooperative Thread Array Overview

In some embodiments, multithreaded processing core 210 of FIG. 2 executes general-purpose computations using cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. Examples include matrix algebra, linear and/or nonlinear transforms in any number of dimensions (e.g., fast Fourier transforms), various filtering algorithms, pseudorandom number generators, and so on. The processing algorithm to be applied to each portion of the input data set is specified in a "CTA program," and each thread in a CTA executes the same CTA program on one portion of the input data set. A CTA program can implement algorithms using a wide range of mathematical and logical operations, and the program can include conditional or branching execution paths and direct and/or indirect memory access.

Threads in a CTA can share input data, processing parameters, and/or intermediate results with other threads in the same CTA using shared memory 206. In some embodiments, a CTA program includes an instruction to compute an address in shared memory 206 to which particular data is to be written, with the address being a function of thread ID. Each thread computes the function using its own thread ID and writes to the corresponding location. The address function can be defined such that different threads write to different locations; as long as the function is deterministic, the location written to by any thread is predictable. Likewise, the CTA program can include an instruction to compute an address in shared memory 206 from which data is to be read, with the address being a function of thread ID. By defining suitable functions and exploiting thread synchronization techniques, e.g., as described in above-referenced application Ser. No. 11/303,780, different threads in a CTA can access the same location at different times. For instance, data can be written to a given location in shared memory 206 by one thread and read from that location by a different thread in a predictable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched, as described in above-referenced application Ser. No. 11/303,780. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (T) of threads, thread IDs are simply sequential (one-dimensional) index values from 0 to T−1. In other embodiments, multidimensional indexing schemes can be used.

It will be appreciated that the size (number of threads) of a CTA required for a particular application will depend on the application. Thus, the size of a CTA is advantageously defined by a programmer or driver program and provided to core 210 and core interface 203 as a state parameter. CTAs are described in further detail in above-referenced application Ser. No. 11/303,780.

Mersenne Twister Using a CTA

In accordance with an embodiment of the present invention, a CTA is used to implement a Mersenne Twister algorithm with parallelism at the loop level. In one embodiment, the state array MT is stored in shared memory 206 of FIG. 2. Different threads of the CTA are associated with each of the elements of the array MT. For instance, a CTA with 624 threads having sequential thread identifiers from 0 to 623 can be defined. The thread with thread ID tid can be associated with element MT[tid]. In the twister phase, the threads are executed in subsets of mutually independent threads, and the elements of MT are updated in order to the extent needed to preserve correct behavior while still providing a high degree of parallelism.

The twister phase of the Mersenne Twister algorithm, as shown in Eq. 1 above, has two data dependencies that constrain the order in which operations updating the state array elements can be performed. First, for each element kk in the MT array except the last, a temporary variable y is computed using element MT[kk] and the next element MT[kk+1]; in each case, y is computed before updating either MT[kk] or MT[kk+1]. For the last element MT[623], the temporary variable y is computed using MT[623] and the updated MT[0]. Therefore, in a CTA implementation, each thread except the last thread (i.e., the thread with tid=623) should read the appropriate MT[tid] and MT[tid+1] values from shared memory 206 and compute its temporary variable y before any updates are made to any elements of MT. The temporary variable y is local to each thread, and each thread may store its y value in a different register in local register file 204. As long as this is the case, the order in which different threads (except the last thread) compute the temporary variable y is irrelevant to the results. As described below, this behavior can be ensured by synchronizing the threads of the CTA at appropriate points during program execution.

Figure 3:
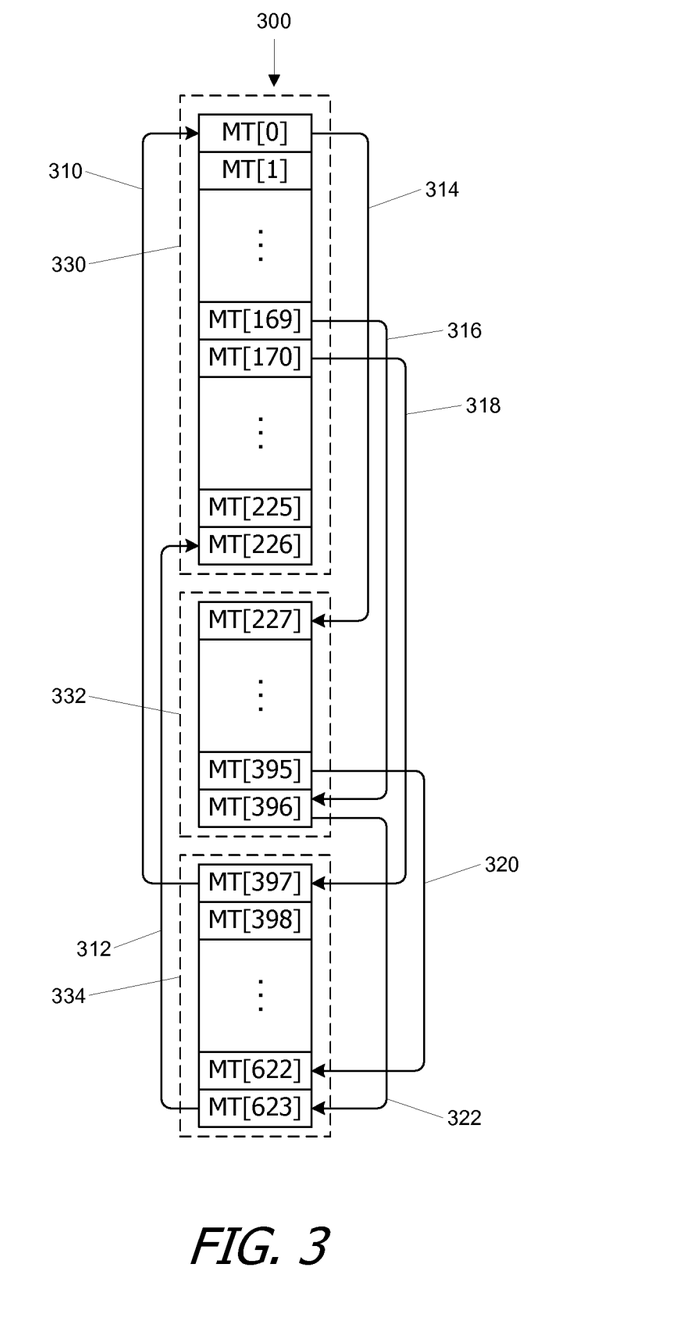
FIG. 3 is a diagram illustrating the data dependencies in the twister phase of a Mersenne Twister algorithm.

Second, as will be apparent from Eq. 1 above, the updated value of each element MT[kk] depends on another element MT[(kk+397) % 624]. This dependence restricts the order in which different elements of MT can be updated. FIG. 3 is a diagram illustrating the data dependencies in the twister phase of the Mersenne Twister algorithm represented in Eq. 1. Referring to FIG. 3, an array 300 stores the 624-element array MT. During the twister phase, element MT[0] is updated using element MT[397] as indicated by arrow 310, MT[1] is updated using element MT[398], and so on until element MT[226] is updated using element MT[623] as indicated by arrow 312. Element MT[227] is then updated using the updated value of MT[0], as indicated by arrow 314, and so on until element MT[396] is updated using the updated value of element MT[169], as indicated by arrow 316. Element MT[397] is updated using the updated element MT[170] as indicated by arrow 318, and so on until element MT[622] is updated using the updated element MT[395] as indicated by arrow 320. Element MT[623] is updated using updated element MT[396] as indicated by arrow 322.

As FIG. 3 and Eq. 1 indicate, the updates to elements MT[0] to MT[226] rely on the values that were present in elements MT[397] to MT[623] at the beginning of the twister phase. Thus, the updates to elements MT[0] through MT[226] all need to be done before any of elements MT[397] through MT[623] are updated. The order in which elements MT[0] through MT[226] are updated, however, has no effect on the result. Accordingly, the updates to elements MT[0] through MT[226] are advantageously defined as a first subset of updates, as indicated by dotted box 330. In one embodiment, thread synchronization techniques are employed to guarantee that all threads in the first subset update their respective elements MT[tid] before any other threads perform updates.

The updates to elements MT[227] through MT[396] rely on updated values of elements MT[0] through MT[169]; thus, these updates must be done after the updates to elements MT[0] through MT[169]. The order in which elements MT[227] through MT[396] are updated, however, has no effect on the result. Accordingly, the updates to elements MT[227] through MT[396] are advantageously defined as a second subset of updates, as indicated by dotted box 332. In one embodiment, thread synchronization techniques are advantageously employed to guarantee that all threads in the second subset update their respective elements MT[tid] after the threads in the first subset perform their updates and before any of the remaining threads perform updates.

It should be noted that the second subset could be extended beyond thread 396. For example, element MT[226] is the last element in the first subset 330. Element MT[226] is used to update element MT[453] (not shown), so the second subset could be extended as far as element MT[453]. In some embodiments, element MT[396] is chosen as the last element of the second subset because updated element MT[396] is used to update element MT[623], the last element of the array. In some embodiments where the threads of a CTA are executed in SIMD groups (e.g., as described above with reference to FIG. 2), the last element in the second subset is chosen based on the size of a SIMD group. For instance, if SIMD groups are 16 or 32 threads, the second group might include 192 threads (a multiple of 32).

The remaining elements MT[397] through MT[623] are updated using already-updated elements MT[170] through MT[396]. These updates are advantageously performed after all threads of the second subset have finished their updates. Again, the order in which MT[397] through MT[623] are updated has no effect on the result. Accordingly, the updates to MT[397] through MT[623] are advantageously defined as a third subset of updates, as indicated by dotted box 334. In one embodiment, thread synchronization techniques are advantageously employed to guarantee that all threads in the third subset update their respective elements MT[tid] only after the threads in the first and second subsets have completed their updates.

Figure 4A:
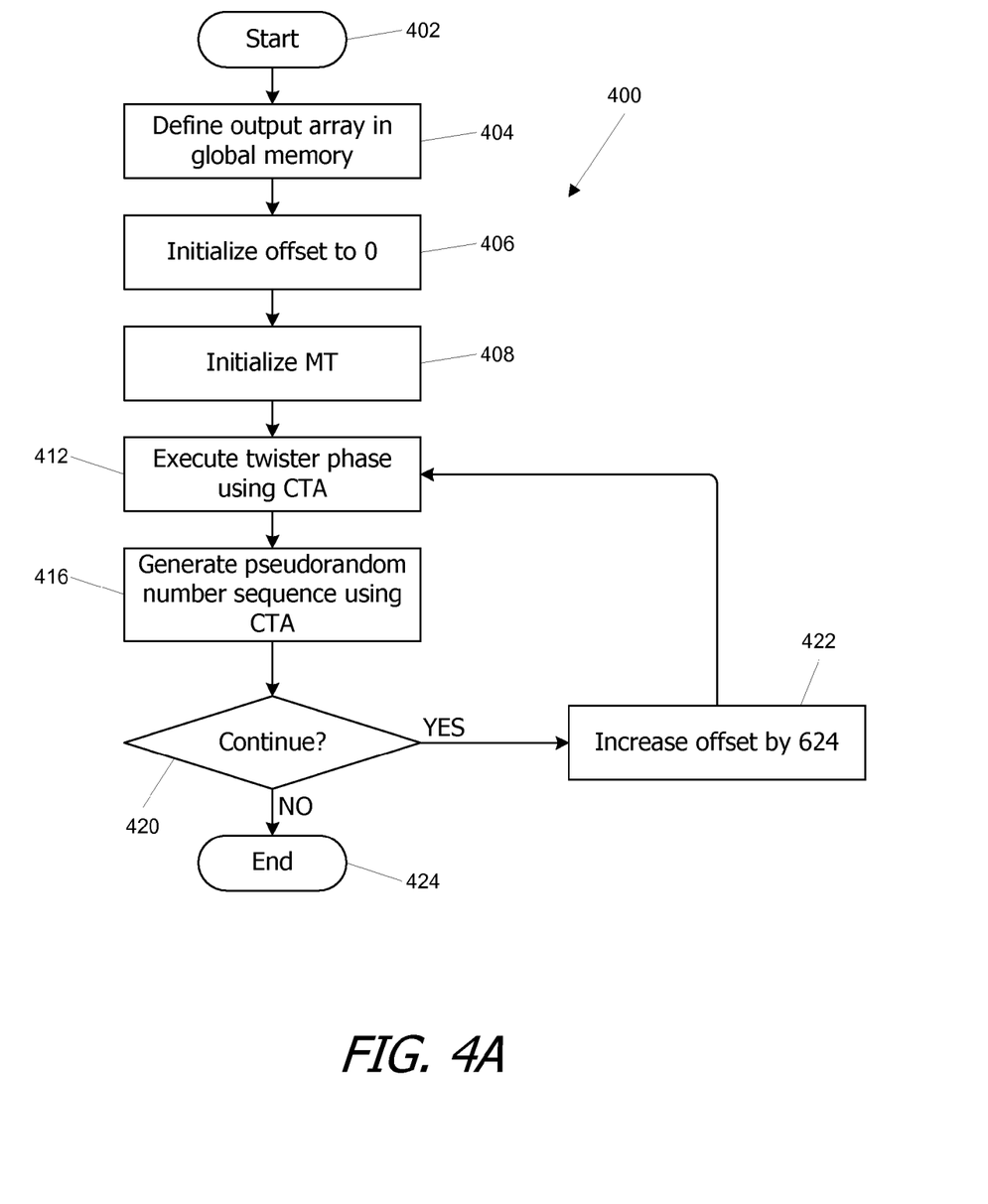
FIGS. 4A-4C are flow diagrams of a process for executing a Mersenne Twister in a CTA according to an embodiment of the present invention.
Figure 4B:
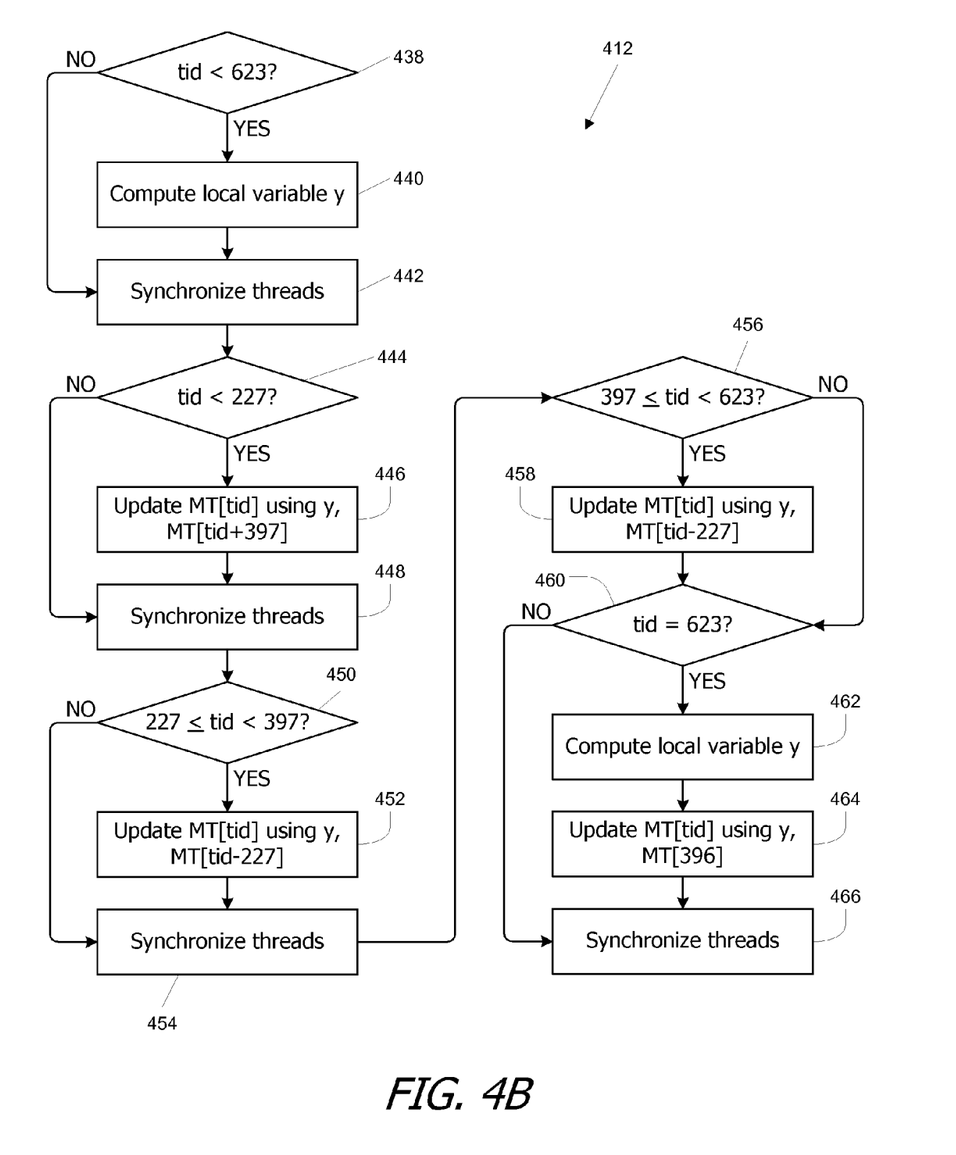
Figure 4C:
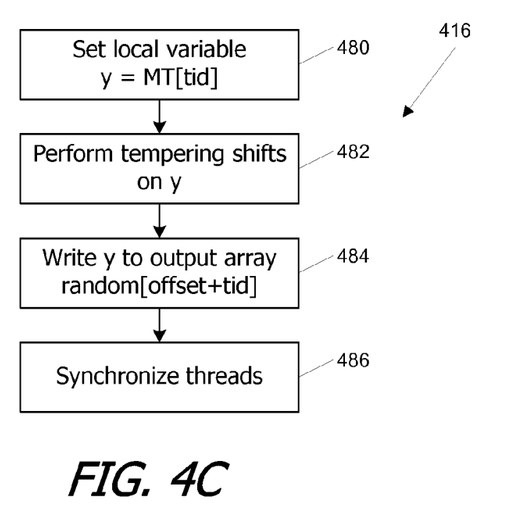

FIGS. 4A-4C are flow diagrams of a process 400 for executing a Mersenne Twister using a CTA to generate an array of pseudorandom numbers according to an embodiment of the present invention. Portions of process 400 may be implemented as a CTA program that is executed by each thread of a CTA. Each thread of the CTA has access to a state array MT[0:623], which may be stored, e.g., in shared register file 206 of core 210 of FIG. 2. Each thread also stores its own local variables including its thread identifier tid and a temporary variable y; as described above, threads may store local variables in an allocated portion of local register file 204. The values of local variables are not synchronized or shared between the threads. Each thread also has access to an output array, random[0:n−1], that stores up to some number n of random numbers generated by the threads, as well as a global offset variable (offset) that is used to control where threads write within the output array. The output array may be located, e.g., in global memory 220, and the offset may be provided as a state parameter to core 210 for use by the CTA threads.

FIG. 4A provides a high-level overview of process 400. Process 400 starts (step 402) by defining an output array random [0:n−1] in global memory 220 of FIG. 2 at step 404. The output array, which may include as many elements as desired, is used to store the pseudorandom number stream generated using the Mersenne Twister. At step 406, the offset is initialized (e.g., to zero). As described below, the offset is used to control where each thread writes within the output array, allowing the pseudorandom numbers generated in multiple iterations of the Mersenne Twister to be stored in a single output array.

At step 408, the state array MT is initialized. As is known in the art, the state array MT for the Mersenne Twister can be initialized by providing a seed value that is stored in MT[0]. Each succeeding element MT[kk] is then initialized by computing MT[kk] based on MT[kk−1]. For instance, in one implementation, MT[kk]=(69069*MT[kk−1]+1) & ($2^{32}$−1), where "&" is a bitwise AND operator and $2^{32}$−1 is represented as a bit field of 32 "1"s. In one embodiment of the present invention, the state array MT is initialized in global memory 220 of FIG. 2 by sequentially executing the computation for each element of MT using CPU 102 of FIG. 1, then read into shared memory 206 by the threads of the CTA (e.g., each thread might read the element MT[tid]). Alternatively, the CTA program can include instructions to initialize the MT array from a seed supplied as a state parameter; one of the threads might be configured to iteratively initialize all MT elements while the other threads wait at a synchronization point. In still other embodiments, a seed vector—i.e., an array of seed values, which may provide any number (up to 624) of seeds—rather than a single seed may be used; conventional algorithms for initializing from a seed vector may be implemented to execute on either the CPU or the CTA.

At step 412, the twister phase is executed to modify the state array MT. During the twister phase, each subset of threads (e.g., as described above with reference to FIG. 3) executes in turn to update a portion of the state array MT. Step 412 is described below with reference to FIG. 4B.

At step 416, each thread of the CTA generates a number using its array element MT[tid] and writes the number to the output array at a location random[offset+tid]. All threads use the same offset, so each thread writes to a different location within a 624-element section of the output array. Entries in the output array, read sequentially, correspond to a singe pseudorandom number stream even though different entries are generated by different threads. Step 416 is described further below with reference to FIG. 4C.

At step 420, it is determined whether execution of the CTA should continue. For instance, the state parameters for the CTA may indicate a number of iterations of steps 412 and 416 to be performed (e.g., based on the total number n of pseudorandom numbers that are to be generated), and step 420 may include determining whether that number of iterations has been reached.

If execution is to continue, then at step 422, the offset can be increased by 624 so that during the next iteration, the threads will write to the next 624-element section of the output array. The threads then return to step 412 to perform the next twister phase. Once enough pseudorandom numbers have been generated, process 400 ends (step 424).

Referring to FIG. 4B, there is shown a twister-phase process that can be executed by each thread of the CTA at step 412 of process 400 to update the state array MT. At step 438, the thread checks its thread identifier tid to determine whether it is the last thread (i.e., whether tid=623) or another thread (i.e., whether tid<623). At step 440, each thread except the last thread computes a local variable y using:

$$y = MSB(MT[tid]) | LSBS(MT[tid+1]). \quad (Eq. 4)$$

The last thread (tid=623) skips step 440, since computing y for the last thread requires the updated value for element MT[0], which has not yet been determined.

Since Eq. 4 does not affect any of the values stored in array MT, there is no need to constrain the order in which the threads compute their respective y values. However, it will be appreciated that a thread with identifier tid should finish computing y before either MT[tid] or MT[tid+1] is updated. Accordingly, at step 442 the threads are synchronized to ensure that all threads except the last have computed their respective y values before any elements of array MT are modified. For instance, a "syncthreads" command may be included in the sequence of program commands. The syncthreads command can be any command that is recognized by the processor as indicating that no threads are to execute code subsequent to the syncthreads command until all threads have executed all code prior to that command.

Thread synchronization can be implemented using a variety of techniques. In one embodiment, when a thread encounters the syncthreads command, it generates an "arrival" signal for an instruction unit (e.g., instruction unit 212 of FIG. 2) that controls instruction issue for the threads of the CTA. After receiving the arrival signal from a particular thread, the instruction unit defers issuing further instructions for that thread until such time as the instruction unit receives corresponding arrival signals from all of the threads of the CTA. In embodiments such as that shown in FIG. 2, where instruction unit 212 issues SIMD instructions to SIMD groups of threads, arrival at the synchronization point may be detected and signaled on a per-SIMD-group basis, rather than for individual threads. Implementations of thread synchronization are described in above-referenced application Ser. No. 11/303,780. Those skilled in the art will appreciate that other techniques for synchronizing threads may be substituted; a particular synchronization technique is not critical to the present invention.

Referring again to FIG. 4B, after the threads have synchronized at step 442, threads in a first subset can update their respective elements MT[tid]. Thus, at step 444, the thread checks its thread identifier tid to determine whether it is in the first subset. In the embodiment shown in FIG. 3, the first subset 330 includes threads with tid<227. These threads proceed to step 446 to update their respective elements MT[tid]. For example, each thread in the first subset may compute:

$$MT[tid] = U(MT[tid+397], y), \quad (Eq. 5)$$

where U is defined as in Eq. 2 above.

Threads that are not in the first subset skip step 446. At step 448, all of the threads are synchronized, e.g., using another syncthreads command. When all of the threads have reached step 448, it is guaranteed that updates to elements MT[0] through MT[226] are complete. Threads in a second subset can then update their respective elements MT[tid].

Accordingly, at step 450, the thread checks its thread identifier tid to determine whether it is in the second subset. In the embodiment shown in FIG. 3, the second subset 332 includes threads with 227≤tid<397. These threads proceed to step 452 to update their respective elements MT[tid]. For example, each thread in the second subset may compute:

$$MT[tid] = U(MT[tid-227], y), \quad (Eq. 6)$$

Threads that are not in the second subset skip step 452. At step 454, all of the threads are again synchronized, e.g., using another syncthreads command. When all of the threads have reached step 454, it is guaranteed that updates to elements MT[0] through MT[396] are complete. Threads in the third (and final) subset can then update their respective elements MT[tid].

Accordingly, at step 456, the thread checks its thread identifier tid to determine whether it is in the third subset. In the embodiment shown in FIG. 3, the third subset 334 includes threads with 397≤tid<623, as well as the thread with tid=623. At step 458, threads with 397≤tid<623 update their respective elements MT[tid]. For example, each of these threads may compute:

$$MT[tid] = U(MT[tid-227], y). \quad (Eq. 7)$$

Threads that do not satisfy the condition at step 456 skip step 458. At step 460, the thread checks its thread identifier tid to determine whether it is the last thread (e.g., whether tid=623). At step 462, the last thread computes its local variable y, e.g., using:

$$y = MSB(MT[623]) | LSBS(MT[0]). \quad (Eq. 8)$$

At step 464, the last thread updates its MT[tid]. For example, the last thread may compute:

$$MT[623] = U(MT[396], y). \quad (Eq. 9)$$

All threads other than the last thread skip steps 462 and 464. At step 466, all of the threads are again synchronized, e.g., using another "syncthreads" command. When all of the threads have reached step 464, it is guaranteed that updates to all elements of array MT are complete and it is safe for the threads to begin generating their respective pseudorandom numbers using MT. It should be noted that another synchronization step before step 460 is not required, since elements MT[0] and MT[396] are guaranteed to have been updated before step 460 is reached, regardless of whether all threads have finished the computation at step 458.

Referring now to FIG. 4C, there is shown a process that can be executed at step 416 of process 400 by each thread of the CTA to generate a pseudorandom number. At step 480, the thread sets its local variable y to MT[tid]. At step 482, the thread performs a sequence of tempering shifts on y, similar to those shown in Eq. 2 above. For example, the thread may execute the following sequence of tempering-shift operations:

$$y = y \hat{} ((y>>11));$$

$$y = y \hat{} ((y<<7) \& 2636928640);$$

$$y = y \hat{} ((y<<15) \& 4022730752);$$

$$y = y \hat{} (y>>18); \quad (Eq. 10)$$

Since these operations affect only the local variable y, all of the threads may execute these operations in parallel with each other; to the extent that different threads are executed sequentially, the order in which different threads execute these operations is irrelevant to the result.

At step 484, the thread writes the final value of y resulting from Eq. 10 to the output array in global memory 220 at a location random[offset+tid]. All threads use the same offset, but since each thread has a different thread identifier tid, each thread will write to a different location. Thus, a portion of the output array becomes populated with a stream of 624 pseudorandom numbers, regardless of whether the numbers are actually generated in stream order.

At step 486, the threads are synchronized, e.g., using a syncthreads command. Synchronizing the threads at this point ensures that all threads have read from array MT and written their output data to the output array before any use is made of the output array and before any further updates to MT occur.

It will be appreciated that the Mersenne Twister implementation described herein is illustrative and that variations and modifications are possible. Steps described as sequential may be executed in parallel, order of steps may be varied, and steps may be modified or combined. For instance, numerous variations of the Mersenne Twister, as well as other pseudorandom number generators that employ similar feedback shift procedures, are known in the art, and many of these algorithms can be implemented using CTAs as described herein. In some embodiments, using the CTA implementation described herein provides improved performance over a conventional (single-thread per stream) Mersenne Twister implementation. For instance, a suitably configured processor (e.g., processing core 210 of FIG. 2) can execute multiple threads of a CTA in parallel, e.g., in SIMD groups as described above. During the twister phase, parallel execution of multiple updates to the elements of array MT is faster than sequentially executing loop iterations. During the generation phase, parallel generation of multiple pseudorandom numbers further enhances performance. In the embodiments described herein, parallel execution of threads is constrained only by the synchronization points; other constraints come from hardware, which may limit the number of threads that can be executed in parallel.

In one embodiment, a CTA implementation executing in a PPU core similar to core 210 of FIG. 2 with 16-way SIMD parallelism was able to produce approximately six times as many numbers per second as a conventional single-threaded implementation executed in a conventional single-core CPU. The performance gain depends in part on the particular hardware implementation (e.g., clock speed, degree of parallelism, etc.).

Using CTAs to Process a Loop with Data Dependencies

Those skilled in the art with access to the present teachings will recognize that the present invention is not limited to the Mersenne Twister or to pseudorandom number generation. A variety of data-processing algorithms include loops with "internal" data dependencies, i.e., cases in which a result computed during a current iteration of the loop is dependent on a result computed during a previous iteration of the same loop. To the extent that the iterations of the loop can be divided into a relatively small number of subsets of iterations that do not have internal data dependencies, techniques similar to those described herein can be used to adapt the algorithm for execution in a CTA rather than a loop.

Figure 5:
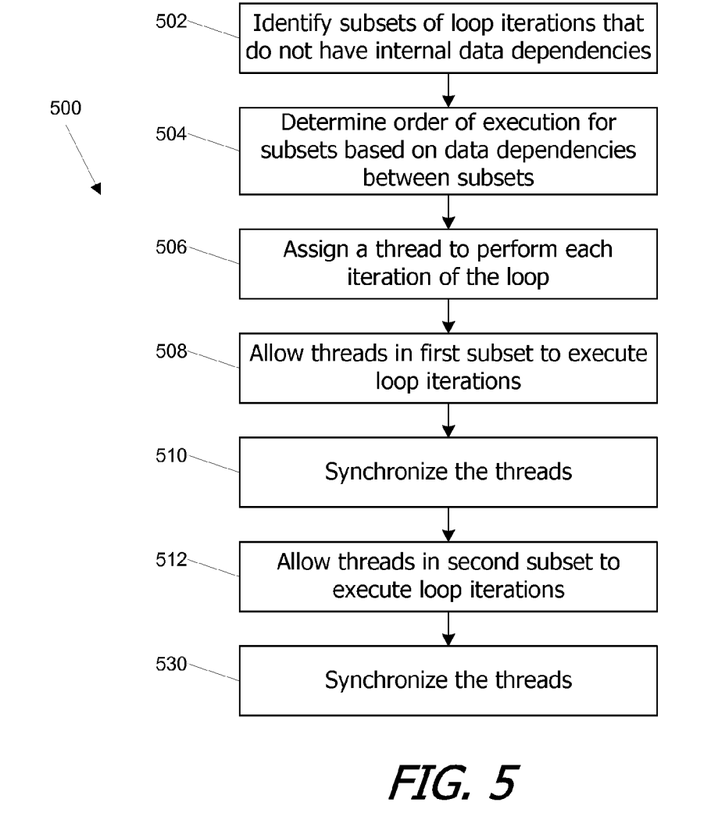
FIG. 5 is a flow diagram of a process for implementing a loop-based algorithm using a CTA to partially parallelize the loop according to an embodiment of the present invention.

FIG. 5 is a flow diagram of a process 500 for implementing a loop-based algorithm using a CTA to parallelize the loop to at least some extent according to an embodiment of the present invention. Process 500 can be applied to any loop that includes at least some internal data dependencies.

At step 502, the loop iterations are divided into two or more subsets of iterations that do not have internal data dependencies. That is, the result of any iteration in a particular subset does not depend on a result of any other iteration in that subset; thus all iterations in the same subset could potentially be performed in parallel or in a different order without affecting the result. Iterations in different subsets might or might not have data dependencies and are advantageously prevented from being performed in parallel. A loop can be divided into as many subsets as desired. Those skilled in the art will appreciate that a smaller number of subsets will tend to optimize performance by increasing the number of iterations that can be executed in parallel or overlapping fashion, but the number and pattern of data dependencies may impose a lower bound on the number of subsets that can be used in a particular case. For instance, in the case of the Mersenne Twister depicted in FIG. 3, three subsets are the minimum needed to eliminate intra-subset data dependencies.

At step 504, an order of execution for the subsets of iterations identified at step 502 is determined, based on the data dependencies that exist between different subsets. For instance, referring to FIG. 3, elements in subset 332 have data dependencies on elements in subset 330; thus, updates for elements in subset 330 are executed before updates for elements in subset 332. Similarly, elements in subset 334 have data dependencies on elements in both subset 330 and subset 332; accordingly, updates for elements in subset 334 are executed after updates for elements in subsets 330 and 332.

At step 506, the loop is mapped onto a CTA; specifically, threads of the CTA are assigned to particular iterations of the loop. It should be noted that the threads assigned to iterations in the same subset might or might not have sequential thread identifiers, and in some embodiments, one thread might be assigned to execute multiple iterations of a loop.

At step 508, threads in the first subset are allowed to execute their respective iterations of the loop; for instance, as described above, conditional statements in the program code based on thread-identifier values may be used to control execution. After the threads of the first subset finish their iterations, the threads are synchronized at step 510, e.g., by providing a syncthreads command in the program code. Thus, while the threads in the first subset are executing their iterations, the other threads are simply waiting for synchronization to occur. Once the threads of the first subset finish, they reach the syncthreads command, and synchronization (step 510) is achieved. Thereafter, at step 512, threads of the second subset are allowed to execute their iterations. The steps of synchronizing the threads then allowing threads of the next subset to execute their respective iterations can be repeated until all threads have executed their iterations. A final synchronization step 530 may be used to ensure that execution of all iterations is completed before proceeding further.

FURTHER EMBODIMENTS

Embodiments described above provide techniques for using arrays of cooperating threads to process loops with internal data dependencies. Execution of different loop iterations can be parallelized to the extent that parallel execution is consistent with the data dependencies. CTAs provide several beneficial features for parallelizing a loop. First, each thread of a CTA has a unique thread identifier and can use that thread identifier to determine which portions of the program code it is or is not to execute. Thus, even though the threads execute the same program, one group of threads might execute code that is skipped by other threads. Second, the threads of a CTA can share data with each other; thus, data produced by a thread in a first subset can be consumed by a thread in a second subset that executes at a later time. Third, the threads of a CTA can be synchronized with each other at any point during program execution, which can be used to guarantee that threads in a first subset finish executing their loop iterations before threads in a later subset attempt to consume data produced by threads in the first subset.

While the invention has been described with respect to specific embodiments, one skilled in the art will recognize that numerous modifications are possible. For instance, the Mersenne Twister described herein provides just one example of a loop where the data dependencies allow a sufficiently high degree of parallelism that a CTA implementation can significantly enhance throughput (e.g., as measured in numbers generated per second). Other loops with similar characteristics exist and can benefit from CTA implementations. Thus, the present invention is not limited to the Mersenne Twister or to pseudorandom number generation.

While the embodiments described above may make reference to specific hardware and software components, those skilled in the art will appreciate that different combinations of hardware and/or software components may also be used and that particular operations described as being implemented in hardware might also be implemented in software or vice versa.

In some embodiments, program code including CTA program code for executing a Mersenne Twister or other algorithms in which subsets of threads can execute loop code in parallel except as limited by data dependencies can be provided as one or more library functions that application programs can invoke as needed. The library functions may include driver API calls that instruct a driver program executing on a CPU to send commands that define the CTA(s) to a PPU, which executes the CTA(s) as specified by the driver.

Computer programs incorporating features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for generating a plurality of data values, the method comprising:
    defining a thread array having a plurality of threads, each thread being assigned to perform an iteration of a loop to compute a different one of a plurality of data values, each thread being configured to execute a same program, wherein each thread in the plurality of threads performs a different iteration of the same loop;
    assigning each thread to one of a plurality of subsets of threads that are independent of each other, the plurality of subsets including at least a first subset and a second subset, by:
        identifying threads for the first subset of threads, wherein none of the threads in the first subset of threads depend on values to be computed by any of the other threads in the first subset of threads; and
        identifying threads for the second subset of threads, wherein none of the threads in the second subset of threads depend on values to be computed by any of the other threads in the second subset of threads, wherein none of the threads in the first subset depend on data values to be computed by any of the threads in the second subset and at least some of the threads in the second subset depend on data values to be computed by at least some of the threads in the first subset;
    determining an order of execution based on data dependencies that exist between the first subset of threads and the second subset of threads; and
    executing the thread array, wherein execution of the thread array includes:
    for each of the threads in the first subset, computing a data value and storing the data value in a memory, wherein computing the data value is performed in parallel for at least two of the threads in the first subset; and
    for each of the threads in the second subset, computing a data value and storing the data value in the memory, wherein computing the data value is performed in parallel for at least two of the threads in the second subset and wherein for at least some of the threads in the second subset, computing the data value includes reading from the memory at least one of the data values generated by the threads in the first subset,
    wherein the act of storing the data value in the memory is performed for all of the threads in the first subset before the act of computing the data value is performed for any of the threads in the second subset.

2. The method of claim 1 wherein executing the thread array further includes:
    for each of the threads in the thread array, executing a thread synchronization command after storing the data value in the memory for all of the threads in the first subset and before computing the data value for any of the threads in the second subset.

3. The method of claim 1 wherein each thread of the thread array has a unique thread identifier and wherein assigning the threads to the subsets includes using the thread identifier of each thread to assign that thread to one of the subsets.

4. The method of claim 1 wherein the plurality of subsets further includes a third subset, wherein at least some of the threads in the third subset depend on data values to be computed by threads in the second subset, the method further comprising:
    for each of the threads in the third subset, computing a data value and storing the data value in the memory, wherein computing the data value is performed in parallel for at least two of the threads in the third subset,
    wherein the act of storing the data value in the memory is performed for all of the threads in the second subset before the act of computing the data value is performed for any of the threads in the third subset.

5. A method for updating a plurality of data elements, the method comprising:
    defining a thread array having a plurality of threads, each thread being assigned to perform an iteration of a loop, each thread being associated with a target one of a plurality of data elements and further being associated with a source one of the plurality of data elements to be used to update the target data element, each thread being configured to execute a same program, wherein each thread in the plurality of threads performs a different iteration of the same loop;
    assigning each thread to one of a plurality of subsets of threads that independently update the respective target data elements associated therewith, by:
        identifying threads for a first one of the plurality of subsets of threads, wherein none of the threads in the first one of the plurality of subsets of threads depend on values to be computed by any of the other threads in the first one of the plurality of subsets of threads; and identifying threads for a second one of the plurality of subsets of threads, wherein none of the threads in the second one of the plurality of subsets of threads depend on values to be computed by any of the other threads in the second one of the plurality of subsets of threads, wherein each thread in the first one of the plurality of subsets updates the target data element associated therewith using an initial value of the source data element associated therewith and wherein at least some of the target data elements associated with the threads of the first subset are the source data elements for at least some of the threads in the second one of the plurality of subsets;

determining an order of execution based on data dependencies that exist between the first one of the plurality of subsets of threads and the second one of the plurality of subsets of threads; and executing the thread array, wherein execution of the thread array includes:

for each of the threads in the first subset, computing an updated value for the target data element associated therewith based at least in part on the initial value of the source data element associated therewith and storing the updated value of the target data element in a memory, wherein computing the updated value is performed in parallel for at least two of the threads in the first subset; and for each of the threads in the second subset, computing an updated value for the target data element associated therewith using the value of the source data element associated therewith and storing the updated value of the target data element in the memory, wherein computing the updated value is performed in parallel for at least two of the threads in the second subset, wherein the act of storing the updated value is performed for all of the threads in the first subset before the act of computing is performed for any of the threads in the second subset.

6. The method of claim 5 wherein the data elements are elements of a state array for a pseudorandom number generator.

7. The method of claim 6 wherein executing the thread array further includes, after all of the threads in the thread array have updated the respective target data elements associated therewith:

for each of the threads in the thread array, generating a respective pseudorandom value using the target data element associated therewith; and storing the pseudorandom value in an output array in a memory, wherein each thread stores its respective pseudorandom value in a different location in the output array.

8. The method of claim 7 wherein each of the threads has a unique numerical thread identifier and wherein the location in the output array in which each thread stores its respective pseudorandom value is determined based in part on the thread identifier.

9. The method of claim 6 wherein executing the thread array further includes, after all of the threads in the thread array have updated the respective target data elements associated therewith:

for each of the threads in the thread array, generating a respective pseudorandom value using the target data element associated therewith; and storing the pseudorandom value in an output array in a memory, wherein each thread stores its respective pseudorandom value in a different location in the output array.

10. The method of claim 5 wherein each of the threads has a unique numerical thread identifier and wherein the association of a source data element and a target data element with each thread is based on the thread identifiers.

11. The method of claim 5 wherein executing the thread array further includes:

for each of the threads in the thread array, executing a thread synchronization command after storing the data value in the memory for all of the threads in the first subset and before computing the data value for any of the threads in the second subset.

12. A computer program product comprising:

a non-transitory computer readable medium encoded with program code for controlling operation of a computer system, the program code including:

program code for defining a thread array having a plurality of threads, each thread being assigned to perform an iteration of a loop to compute a different one of a plurality of data values, each thread being configured to execute a same program, wherein each thread in the plurality of threads performs a different iteration of the same loop;

program code for assigning each thread to one of a plurality of subsets of threads that are independent of each other, the plurality of subsets including at least a first subset and a second subset, wherein at least two of the threads in the first subset are to be executed in parallel with each other and at least two of the threads of the second subset are to be executed in parallel with each other, wherein the program code assigns threads to the first subset of threads and the second subset of threads by:

identifying threads for the first subset of threads, wherein none of the threads in the first subset of threads depend on values to be computed by any of the other threads in the first subset of threads; and identifying threads for the second subset of threads, wherein none of the threads in the second subset of threads depend on values to be computed by any of the other threads in the second subset of threads, wherein none of the threads in the first subset depend on data values to be computed by any of the threads in the second subset and at least some of the threads in the second subset depend on data values to be computed by at least some of the threads in the first subset;

program code for determining an order of execution based on data dependencies that exist between the first subset of threads and the second subset of threads; and program code to be executed by the threads of the thread array, wherein the program code to be executed by the threads of the thread array includes:

a first block of program code for computing a data value and storing the data value in a memory, the first block of program code being executable by threads in the first subset; and a second block of program code for computing a data value and storing the data value in the memory, the second block of program code being executable by threads in the second subset, wherein for at least some of the threads in the second subset, computing the data value includes reading from the memory at least one of the data values generated by the threads in the first subset, wherein the program code further includes control code such that the first block is executed by all of the threads in the first subset before the second block is executed by any of the threads in the second subset.

13. The computer program product of claim 12 wherein the control code includes a thread synchronization command between the first block and the second block.

14. The computer program product of claim 12 wherein each of the thread in the thread array has a unique thread identifier and wherein the program code for assigning the threads to the subsets includes program code for using the thread identifier of each thread to assign that thread to one of the subsets.

15. The computer program product of claim 12 wherein the plurality of subsets further includes a third subset, wherein at least two of the threads of the third subset are to be executed in parallel with each other, wherein at least some of the threads in the third subset depend on data values to be computed by threads in the second subset, and wherein the program code to be executed by the threads of the thread array further includes:
   a third block of program code for computing a data value and storing the data value in the memory, the third block of program code being executable by threads in the third subset,
   wherein the program code further includes control code such that the second block is executed by all of the threads in the second subset before the third block is executed by any of the threads in the third subset.

16. The computer program product of claim 12 wherein the program code further includes:
   program code for generating a pseudorandom number from one of the data values computed by one of the threads; and
   program code for storing the pseudorandom number in a memory.

17. The computer program product of claim 16 wherein the program code for generating a pseudorandom number and the program code for storing the pseudorandom number are included in the program code executable by the threads of the thread array, and wherein each thread generates a pseudorandom number from the data value computed by that thread.

18. A method for updating a plurality of data elements, the method comprising:
   defining a thread array having a plurality of threads, each thread being associated with a target one of a plurality of data elements and further being associated with a source one of the plurality of data elements to be used to update the target data element, each thread being configured to execute a same program;
   assigning each thread to one of a plurality of subsets of threads that independently update the respective target data elements associated therewith, by:
      identifying threads for a first one of the plurality of subsets of threads, wherein none of the threads in the first one of the plurality of subsets of threads depend on values to be computed by any of the other threads in the first one of the plurality of subsets of threads; and
      identifying threads for a second one of the plurality of subsets of threads, wherein none of the threads in the second one of the plurality of subsets of threads depend on values to be computed by any of the other threads in the second one of the plurality of subsets of threads, wherein each thread in the first one of the plurality of subsets updates the target data element associated therewith using an initial value of the source data element associated therewith and wherein at least some of the target data elements associated with the threads of the first subset are the source data elements for at least some of the threads in the second one of the plurality of subsets;
   determining an order of execution based on data dependencies that exist between the first one of the plurality of subsets of threads and the second one of the plurality of subsets of threads; and
   executing the thread array, wherein execution of the thread array includes:
   for each of the threads in the first subset, computing an updated value for the target data element associated therewith based at least in part on the initial value of the source data element associated therewith and storing the updated value of the target data element in a memory, wherein computing the updated value is performed in parallel for at least two of the threads in the first subset; and
   for each of the threads in the second subset, computing an updated value for the target data element associated therewith using the value of the source data element associated therewith and storing the updated value of the target data element in the memory, wherein computing the updated value is performed in parallel for at least two of the threads in the second subset,
   wherein the act of storing the updated value is performed for all of the threads in the first subset before the act of computing is performed for any of the threads in the second subset, and
   wherein the data elements are elements of a state array for a pseudorandom number generator.

19. A computer program product comprising:
   a non-transitory computer readable medium encoded with program code for controlling operation of a computer system, the program code including:
   program code for defining a thread array having a plurality of threads, each thread being assigned to compute a different one of a plurality of data values, each thread being configured to execute a same program;
   program code for assigning each thread to one of a plurality of subsets of threads that are independent of each other, the plurality of subsets including at least a first subset and a second subset, wherein at least two of the threads in the first subset are to be executed in parallel with each other and at least two of the threads of the second subset are to be executed in parallel with each other, wherein the program code assigns threads to the first subset of threads and the second subset of threads by:
      identifying threads for the first subset of threads, wherein none of the threads in the first subset of threads depend on values to be computed by any of the other threads in the first subset of threads; and
      identifying threads for the second subset of threads, wherein none of the threads in the second subset of threads depend on values to be computed by any of the other threads in the second subset of threads, wherein none of the threads in the first subset depend on data values to be computed by any of the threads in the second subset and at least some of the threads in the second subset depend on data values to be computed by at least some of the threads in the first subset;
   program code for determining an order of execution based on data dependencies that exist between the first subset of threads and the second subset of threads; and
   program code to be executed by the threads of the thread array, wherein the program code to be executed by the threads of the thread array includes:

a first block of program code for computing a data value and storing the data value in a memory, the first block of program code being executable by threads in the first subset; and a second block of program code for computing a data value and storing the data value in the memory, the second block of program code being executable by threads in the second subset, wherein for at least some of the threads in the second subset, computing the data value includes reading from the memory at least one of the data values generated by the threads in the first subset, wherein the program code further includes control code such that the first block is executed by all of the threads in the first subset before the second block is executed by any of the threads in the second subset wherein the program code further includes:

program code for generating a pseudorandom number from one of the data values computed by one of the threads; and program code for storing the pseudorandom number in a memory.

20. The computer program product of claim 19 wherein the program code for generating a pseudorandom number and the program code for storing the pseudorandom number are included in the program code executable by the threads of the thread array, and wherein each thread generates a pseudorandom number from the data value computed by that thread.

\* \* \* \* \*